May 19, 1970   F. B. SNYDER   3,513,332
POLYPHASE POWER INTERRUPTION APPARATUS INCLUDING
BIDIRECTIONAL SEMICONDUCTORS
Filed July 27, 1967

INVENTOR.
FRANKLIN B. SNYDER

BY

ATTORNEYS

United States Patent Office 3,513,332
Patented May 19, 1970

3,513,332
POLYPHASE POWER INTERRUPTION APPARATUS INCLUDING BIDIRECTIONAL SEMICONDUCTORS
Franklin B. Snyder, Feasterville, Pa., assignor to the United States of America as represented by the Secretary of the Navy
Filed July 27, 1967, Ser. No. 656,630
Int. Cl. H03k 17/00
U.S. Cl. 307—252
10 Claims

ABSTRACT OF THE DISCLOSURE

A three-phase power interruption apparatus which includes a controllable bidirectional semiconductor interposed in each respective phase between a source of power and a load. Each of the semiconductors is controlled by a respective trigger voltage supply which is connected to receive a voltage from the source having a relatively leading phase. An oscillator driven counter and associated relay circuitry causes the trigger supplies to cease providing the trigger voltage for a predetermined interval so that the semiconductors correspondingly interrupt the provision of power to the load during that interval.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In readying an aircraft for flight, avionics systems and subsystems are inevitably subjected to power interruptions of short durations during the various power transfers. In order to test avionics apparatus for suitability for use in an aircraft under such conditions, it is desirable that the apparatus be subjected to a series of total power interruptions for precisely controlled durations in order to actually observe the effect that the anticipated power transfers would have on the operation of the apparatus. The use of relays with a sufficiently high current capacity to test such avionics apparatus is undesirable in that the opening and closing of the contacts can permit high arcing which would damage the contacts of the relay and, further, would enable some current to continue to flow through the apparatus thereby making a total power interruption for a precisely controlled duration unachievable. Further, the mechanical operation of relays becomes physically difficult if short durations are desired. No simple devices are available which are capable of totally interrupting multi-phase power for short intervals of precisely controlled duration.

SUMMARY OF INVENTION

It is a general purpose of this invention to provide apparatus for subjecting polyphase systems and equipment under test to a total power interruption for a predetermined interval.

Briefly, the general purpose and other objects of this invention which will become apparent from the following description and the accompanying drawing may be accomplished by providing a polyphase power interruption device including controllable, bidirectional semiconductors interposed in respective phases between a power source and a load such as the system or equipment to be tested. Each of the semiconductors for a respective phase is triggered by a respective trigger voltage supply which, in turn, is powered by a source-supplied voltage of relatively leading phase. The trigger supplies are caused by an oscillator driven counter and associated circuitry to simultaneously stop providing the semiconductors with the respective triggering voltages during the predetermined interval.

DESCRIPTION OF PREFERRED EMBODIMENT

Figure 1:
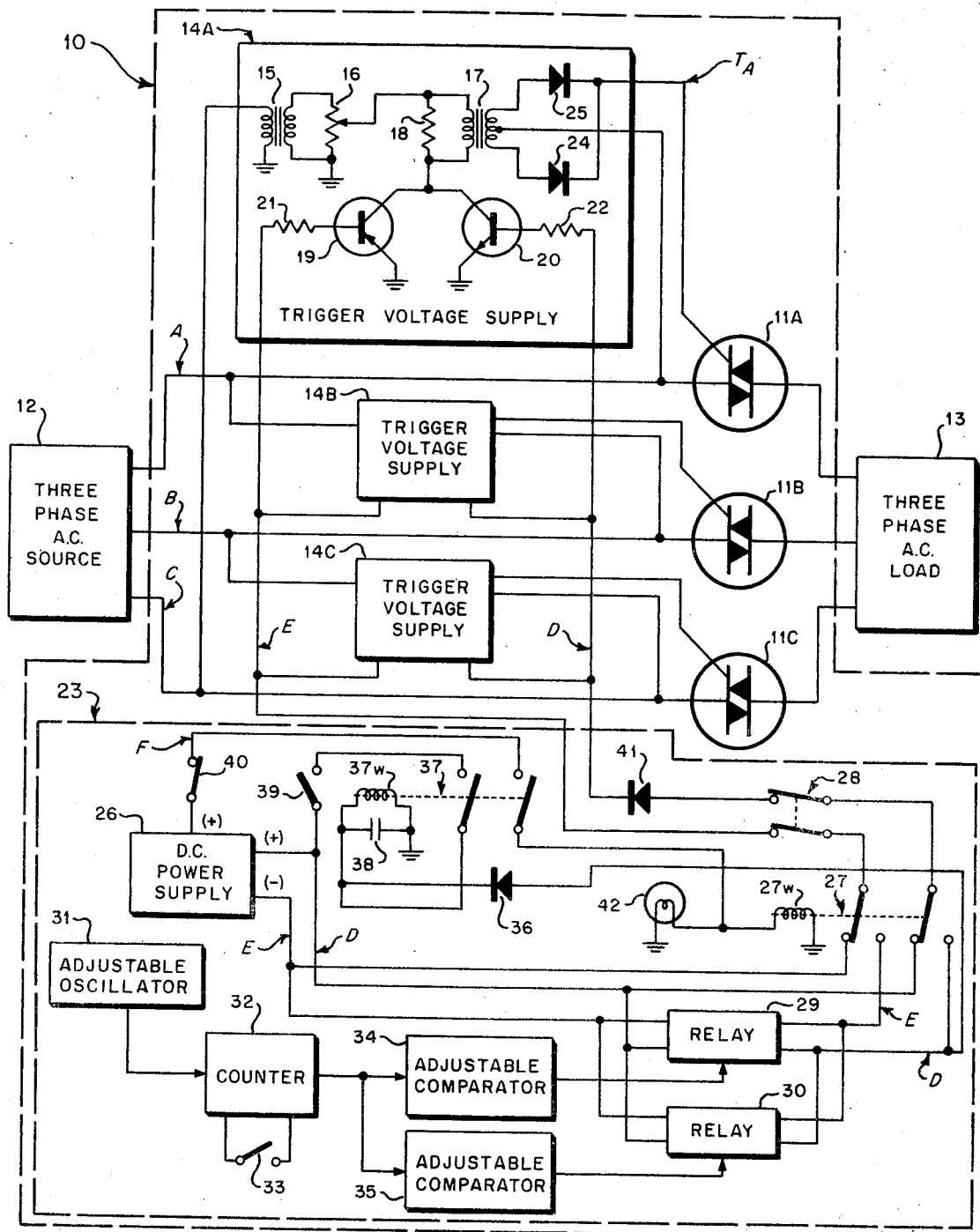
FIG. 1 is a block and partial schematic diagram of a power interrupter interconnected between a polyphase voltage source and a load.

The interrupter 10 of FIG. 1 includes three controllable, bidirectional semiconductors 11A, 11B and 11C each having its primary anode connected to a three-phase A.C. source 12 for receiving voltage of a respective phase and each having its secondary anode connected to an A.C. load 13 such as an avionics system or subsystem to be tested. A suitable semiconductor device capable of passing substantial amounts of alternating power to a load is the "triac" made by the General Electric Company, Schenectady, N.Y. Each of the semiconductors 11A–11C have their gates connected to a respective trigger voltage supply 14A, 14B or 14C for normally receiving therefrom a trigger signal voltage, hereinafter more fully described, which maintains each of the semiconductors 11A–11C in a conducting state whereby power flows therethrough from the source 12 to the load 13.

Figure 2:
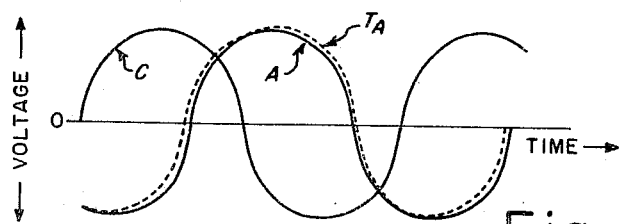
FIG. 2 is a voltage-time diagram of waveforms postulated to be present in the interrupter of FIG. 1.

The trigger voltage supply 14A which enables the semiconductor 11A to conduct current of the phase A includes a step-down transformer 15 whose primary winding is connected to the source 12 to receive voltage of the phase C which relatively leads the phase A as shown by the waveforms C and A of FIG. 2. Similarly, the identical trigger voltage supply 14B which controls the semiconductor 11B for conducting alternating current of the phase B, has its corresponding transformer, not shown, connected to receive voltage of the relatively leading phase A, and the identical trigger voltage supply 14C, which controls the semiconductor 11C for conducting current of phase C, has its corresponding transformer, not shown, connected to receive voltage of the relatively leading phase B.

A grounded potentiometer 16 is connected across the secondary winding of the transformer 15, and its adjustable center top is connected to one end of the primary winding of a second step-down transformer 17. A load resistor 18 is connected across the primary winding of the transformer 17 to bleed off any reverse hysteresis effect which may be present upon the interruption of current through the primary winding so that a resulting current surge in the secondary winding thereof is avoided. The other end of the primary winding of the transformer 17 is connected to the collectors of both a PNP transistor 19 and an NPN transistor 20. The emitters of the transistors 19 and 20 are grounded, and the bases thereof are connected through respective base resistors 21 and 22 to a control unit 23 which normally provides a pair of D.C. bias voltages D and E which bias the transistors 19 and 20 into states of conduction. The secondary winding of the transformer 17 has a center tap which is connected to the primary anode of the semiconductor 11A for receiving the voltage having phase A. The ends of the secondary winding of the transformer 17 are connected to respective anodes of a pair of diodes 24 and 25 whose cathodes are connected together and to the gate of the bidirectional semiconductor 11A.

When the transistors 19 and 20 are each biased into a state of conduction, the positive going and negative going portions of the stepped down voltage applied to the primary winding of the transformer 17 cause corresponding alternating currents to flow through the primary winding of the transformer 17 and through the transistors 19 or 20. The further stepped down voltage induced in the secondary winding of the transformer 17 has a phase which relatively leads phase A and which is substantially the same as phase C except for transformer-introduced phase shifts. This voltage is, in effect, full wave rectified by the diodes 24 and 25 and is superimposed upon the voltage of the phase A which is being applied to the center tap of the secondary winding. The resulting output signal of the trigger supply 14A, which signal is represented by the waveform $T_A$ of FIG. 2, is applied to the gate of the semiconductor 11A and causes the semiconductor 11A to conduct.

As shown in FIG. 2, the trigger signal voltage $T_A$ which is normally applied to the gate of the semiconductor 11A will be relatively more positive than the voltage of phase A which is being applied to the primary anode thereof at the critical time when the current of phase A is changing direction. This assures that the semiconductor 11A will be maintained in a state of conduction since a sufficient difference in potential exists at that time between the gate and the primary anode thereof which enables the succeeding half cycle of current of the phase A to be conducted therethrough. The relatively positive gate signal is preferred because it has been found that the particular bidirectional semiconductors 11A–11C being used operate more efficiently in response thereto. The step down ratios of the transformers 15 and 17 are chosen to assure that the resulting trigger signal voltage $T_A$ at the critical triggering time has a level, relative to the voltage being applied to the primary anode, which is substantially equal to the optimum desired difference in gate-anode potential to be applied for triggering the semiconductor 11A.

When the bias voltages D and E are suddenly disconnected from the transistors such as 19 and 20 of the trigger voltage supplies 14A–14C, the trigger signal voltage such as $T_A$ will no longer be supplied to the semiconductor gates since the currents through the primary windings of the transformers such as 17 are blocked and since the diodes 24 and 25 are thereby prevented from conducting because the necessary forward breakover voltage is not present. Thereby, a total power interruption to the load 13 occurs since the necessary difference in potential between the gate and the primary anodes of each of the semiconductors 11A–11C no longer exists at the critical times to enable each of the semiconductors 11A–11C to conduct the respective succeeding half of cycle of current. Similarly, when the trigger voltage supply transistors such as 19 and 20 again are biased into states of conduction, trigger signal voltages such as $T_A$ of the appropriate magnitude will be reapplied to the gates of the semiconductors 11A–11C, and the provision of power to the load will be resumed.

Control unit 23 includes a D.C. power supply 26 which provides the positive and negative D.C. bias voltage D and E of sufficient magnitudes to bias the transistors such as 19 and 20 of the trigger voltage supplies 14A–14C into states of conduction. The bias voltages D and E are fed from the power supply 26 to a double pole, double throw, relay controlled switch 27, are applied to the terminals on one side thereof which are closed when the relay switch 27 is unenergized, are fed from the terminals on the other side of the switch 27 to a normally closed, double pole, single throw switch 28 and are applied therethrough to the bases of the transistors, such as 19 and 20 in the supplies 14A–14C.

The bias voltages D and E are also fed to a normally closed, double pole, single throw relay 29 and to a normally open, double pole, single throw relay 30. The corresponding bias voltage outputs of the relays 29 and 30 are connected together and are connected to the terminals on the one side of the relay switch 27 which are closed when the relay switch 27 is energized. An adjustable oscillator 31 provides timing pulses to a counter 32 having a reset switch 33. The counter output is applied to a pair of adjustable, present count comparison stages 34 and 35. The stage 34 upon reaching a first predetermined count provides a control signal to the relay 29 causing it to open. Similarly, when the stage 35 reaches a second predetermined count greater than the first, it provides a control signal to the relay 30 causing it to close.

The positive bias voltage D as supplied through either of the relays 29 or 30 is also fed through a diode 36 to the relay winding 37$w$ of a double pole, single throw, relay-controlled switch 37 which is open when unenergized. The winding 37$w$ has a capacitor 38 connected across its terminals and is connected through one of the poles of switch 37 to a normally open switch 39 which, in turn, is connected to the power supply 26 for receiving the positive bias voltage D. The D.C. power supply 26 additionally supplies a positive D.C. voltage F which is applied through a normally closed switch 40 and the other pole of the relay switch 37 to the relay winding 27$w$ of the relay switch 27. A diode 41 is connected between the positive connected pole of the switch 28 and the bases of the transistors such as 20 in the supplies 14A–14C.

A lamp 42 is connected between ground the the junction between the relay switch 37 and the winding 27$w$ of the relay switch 27 and indicates when the relay switch 27 is energized. Thereby, the lamp 42 indicates when the trigger voltage supplies 14A–14C are being controlled by the relays 29 and 30 which, in turn, are controlled by the counter 32 and the associated stages 34 and 35.

When the relay switch 27 is unenergized, closure of the switch 28 enables the trigger voltage supplies 14A–14C to receive the bias voltages D and E directly from the power supply 26 and to cause the semiconductors 11A–11C to conduct so that power from the source 12 is supplied to the load 13. In order to interrupt the power flow to the load 13, the switch 40 is closed, and the counter 32 is reset by using the switch 33. Since the relay 29 is then in its normally closed state, the positive bias voltage D is being applied through the diode 36 to energize the relay switch 37 causing it to be closed. The relay switch 27 thereby is energized so that the trigger voltage supplies 14A–14C are connected to receive the bias voltages D and E through the relay 29. When the stage 34 ascertains the first predetermined count, which may be set to give an interval of two or three seconds, the relay 29 is caused to open and, since the relay 30 is then open, thereby disconnect the bias voltages D and E from the trigger voltage suppies 14A–14C and cause a power interruption.

The relay switch 37 is prevented from opening during the desired power interruption interval by reason of the relatively long discharge time of the capacitor 38. In the event that a longer power interruption is desired than would be permitted by the discharge time of the capacitor 38, the switch 39 can be closed to energize the winding 37$w$ directly from the power supply 26. The diode 36 prevents the capacitor 38 from discharging through the transistors such as 20 in the supplies 14A–14C, and the diode 41 protects the relay winding 37$w$ from spurious negative pulses. Thereby, the power flow to the load 13 is totally interrupted in each phase at the termination of the respective half cycles which the semiconductors 11A–11C were conducting at the time of the trigger signal voltages such as $T_A$ disappeared.

After the desired preset power interruption interval during which time the counter 32 counted the number of pulses equal to the difference between the first and second predetermined counts of the stages 34 and 35, the stage 35 causes the relay 30 to close and, thereby, reapply the bias voltages D and E to the transistors such as 19 and 20 in the trigger voltage supplies 14A–14C. Thereupon, the provision of the appropriate trigger signal voltages such as $T_A$ is immediately resumed, and the precisely controlled power interruption interval is terminated. Of course, the relay switch 37 is thereafter prevented from opening by the bias voltage D which is fed from the relay 30 to the winding 37w through the diode 36.

It has been found convenient to utilize an oscillator 31 which provides the signal having a frequency of one kilocycle so that successive timing pulses indicate the passage of an interval of one millisecond. Thereby the difference between the present count of the stages 34 and 35 may be adjusted to provide interruption intervals in milliseconds. Alternatively, for a given preset difference between the stages 34 and 35, the frequency of the oscillator 31 may be increased or decreased to correspondingly decrease or increase the interruption interval.

At a power frequency of 400 cycles per second, which is characteristic of many aircraft power supplies, an interrupter including the relays described will perform in a satisfactory manner. For power of higher frequencies, it may be desirable to utilize solid state switching devices instead of the interruption controlling relays 29 and 30 and also instead of the relays 27 and 37 whose primary function is to prevent an unintended power interruption.

It should be understood, of course, that the foregoing disclosure relates only to a preferred embodiment of the invention and that numerous modifications or alterations may be made without departing from the spirit and scope of the invention as set forth in the appended claims.

What is claimed is:

1. Apparatus for interrupting the flow of polyphase power from an electrical power source to a load comprising:
   a plurality of controllable bidirectional semiconductors each having a gate, a primary anode for connection in a respective phase to the power source and a secondary anode for connection to the load;
   oscillator means for providing timing pulses;
   power supply means for providing an actuating signal;
   interruption control means including counter means connected to said oscillator means and to said power supply means for providing said actuating signal except during a predetermined interval in response to said timing pulses; and
   a plurality of trigger supply means each connected to said primary anode of a respective one of said semiconductors for receiving an input, each connected to said interruption control means for receiving said actuating signal and each connected to said gate of a respective other of said semiconductors for providing thereto a trigger signal to cause said respective other semiconductor to conduct in response to said actuating signal.

2. Apparatus according to claim 1 wherein said oscillator means includes:
   an adjustable oscillator for providing said timing pulses having an adjustable predetermined frequency.

3. Apparatus according to claim 1 wherein said interruption control means further includes:
   switch means connected to said counter means, said trigger supply means and said power supply means for interconnecting said each said trigger supply means with said power supply means to receive said actuating signal in response to said counter means receiving a predetermined number of pulses.

4. Apparatus according to claim 1 wherein said counter means includes:
   a counter connected to said oscillator means for providing a count signal indicative of the number of said timing pulses received;
   a first comparison stage connected to said counter for providing a first switch control signal in response to said count signal indicating a first predetermined number of said timing pulses;
   a normally closed switch connected to said first comparison stage and interposed between said power supply means and each of said trigger supply means for opening to prevent said trigger supply means from receiving said actuating signal in response to said first switch control signal;
   a second comparison stage connected to said counter for providing a second switch control signal in response to said count signal indicating a second predetermined number of said timing pulses; and
   a normally open switch connected to said second comparison stage and interposed between said power supply means and each of said trigger supply means for closing to enable said trigger supply means to receive said actuating signal in response to said second switch control signal.

5. Apparatus according to claim 4 further including:
   a first relay controlled switch having a first relay winding for interconnecting said normally closed and said normally opened switches with each of said trigger supply means when energized; and
   a second relay controlled switch having a second relay winding connected to said normally closed and said normally open switches and interposed for interconnecting said first relay winding with a relay actuating voltage supply when energized in response to said actuating signal, said second switch including capacitor means connected to said second relay winding for maintaining said second switch in an energized position for a predetermined interval after the occurrence of said first switch control signal.

6. Apparatus for interrupting the flow of polyphase power from an electrical power source to a load comprising:
   a plurality of controllable bidirectional semiconductors each having a gate, a primary anode for connection in a respective phase to the power source and a secondary anode for connection to the load;
   interruption control means for providing an actuating signal;
   a plurality of trigger supply means each including a transformer having a primary winding connected to said primary anode of a respective one of said conductors for receiving an input and having a secondary winding connected to said gate of a respective other of said semiconductors for providing thereto a trigger signal to cause said respective other semiconductor to conduct, said secondary winding thereof having a center tap connected to said primary anode of said respective other of said semiconductors; and
   each said trigger supply means further including transistor means connected to said interruption control means and connected to said primary winding of said transformer for enabling the conduction of current through said primary winding in response to said actuating signal.

7. Apparatus according to claim 6 wherein said interruption control means includes:
   oscillator means for providing timing pulses;
   power supply means for providing said actuating signal; and
   counter means connected to each said trigger supply means, to said oscillator means and to said power supply means for providing said actuating signal to enable said transistor means to conduct except during a predetermined interval in response to said timing pulses.

8. Apparatus according to claim 6 wherein each said trigger supply means further includes:
   a pair of similarly poled diodes connected between said gate and the ends of said secondary winding of said transformer.

9. Apparatus according to claim 6 wherein:
   said transistor means each include first and second transistors connected in parallel to said primary winding for conducting respective half cycles of alternating current therethrough in response to said actuating signal.

10. Apparatus for interrupting the flow of polyphase power from an electrical power source to a load comprising:

a plurality of controllable bidirectional semiconductors each having a gate, a primary anode for connection in a respective phase to the power source and a secondary anode for connection to the load;

interruption control means for providing an actuating signal;

a plurality of rectifying means each connected to said interruption control means and to said primary anode of a respective one of said semiconductors for receiving and rectifying the signal appearing at said anode in response to said actuating signal; and a plurality of combining means each connected to a respective one of said rectifying means and to said primary anode of a respective other of said semiconductors for superimposing the rectified signal upon the signal appearing at said primary anode of said other semiconductor, said combining means being connected to and providing a trigger signal to said gate of said respective other semiconductor to cause said respective other semiconductor to conduct in response to said actuating signal.

References Cited

UNITED STATES PATENTS

| | | | |
|---|---|---|---|
| 2,722,649 | 11/1955 | Immel et al. | 307—252 X |
| 3,110,856 | 11/1963 | Albert | 321—14 |
| 3,189,810 | 6/1965 | MacGregor | 307—252 X |
| 3,273,018 | 9/1966 | Goldberg | 317—20 |
| 3,343,038 | 9/1967 | Johnson | 317—46 |

DONALD D. FORRER, Primary Examiner

S. D. MILLER, Assistant Examiner

U.S. Cl. X.R.

307—305, 296, 13, 85, 96; 317—33; 323—34